(12) United States Patent
Manz et al.

(10) Patent No.: US 10,028,552 B2
(45) Date of Patent: *Jul. 24, 2018

(54) TWO-DIMENSIONAL SHOE MANUFACTURING

(71) Applicant: adidas AG, Herzogenaurach (DE)

(72) Inventors: Gerd Rainer Manz, Herzogenaurach (DE); Jan Hill, Herzogenaurach (DE); Brian Hoying, Herzogenaurach (DE); Angus Wardlaw, Herzogenaurach (DE); Marco Kormann, Herzogenaurach (DE); Christian Lott, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,291

(22) Filed: May 15, 2017

(65) Prior Publication Data

US 2017/0245599 A1  Aug. 31, 2017

Related U.S. Application Data

(63) Continuation of application No. 14/514,081, filed on Oct. 14, 2014, now Pat. No. 9,681,709.

(30) Foreign Application Priority Data

Oct. 16, 2013  (DE) .......................... 10 2013 221 018

(51) Int. Cl.
*A43D 11/00* (2006.01)
*A43D 111/00* (2006.01)
(Continued)

(52) U.S. Cl.
CPC ............ *A43D 111/006* (2013.01); *A43D 8/12* (2013.01); *A43D 95/14* (2013.01); *G06Q 50/04* (2013.01);
(Continued)

(58) Field of Classification Search
CPC ...... A43D 117/00; A43D 111/00; A43D 8/12; A43D 11/00; A43D 95/14; A43D 2200/10;
(Continued)

(56) References Cited

U.S. PATENT DOCUMENTS 1,680,670 A  8/1928  Donovan
1,820,952 A  9/1931  Whelton et al.
(Continued)

FOREIGN PATENT DOCUMENTS

CN  2660955  12/2004
CN  102497997  6/2012
(Continued)

OTHER PUBLICATIONS

Chinese Patent Application No. 201410543429.5, Office Action dated May 18, 2017, 15 pages (8 pages of English translation and 7 pages of original document).
(Continued)

*Primary Examiner* — Ted Kavanaugh
(74) *Attorney, Agent, or Firm* — Kilpatrick Townsend & Stockton LLP

(57) ABSTRACT

Described are methods for the manufacture of a plurality of shoes, an apparatus to perform such method, as well as shoes manufactured by such method. According to certain examples, the method for the manufacture of a plurality of shoes includes providing a plurality of first shoe components for the manufacture of the plurality of shoes, and moving the plurality of first shoe components with a transport means which is at least partially comprised of the plurality of first shoe components.

20 Claims, 6 Drawing Sheets

(51) Int. Cl.
  *A43D 8/12* (2006.01)
  *G06Q 50/04* (2012.01)
  *A43D 95/14* (2006.01)
  *A43B 23/02* (2006.01)

(52) U.S. Cl.
  CPC ....... *A43B 23/0235* (2013.01); *A43D 111/003* (2013.01); *A43D 2200/10* (2013.01); *A43D 2200/20* (2013.01)

(58) Field of Classification Search
  CPC ............ A43D 2200/30; A43D 2200/40; A43D 2200/60; A43B 23/0235; A43B 23/042
  See application file for complete search history.

(56) References Cited

U.S. PATENT DOCUMENTS

| | | | |
|---|---|---|---|
| 1,825,379 | A | 9/1931 | Zonino |
| 1,956,969 | A | 5/1934 | Ayers |
| 1,985,311 | A | 12/1934 | Brauer et al. |
| 2,002,580 | A | 5/1935 | MacDonald |
| 2,012,325 | A | 8/1935 | Tetlow |
| 2,034,091 | A | 3/1936 | Dunbar |
| 2,086,917 | A | 7/1937 | Lattemann |
| 2,141,213 | A | 12/1938 | Chapelle |
| 2,223,844 | A | 12/1940 | Cordeau |
| 2,344,503 | A | 3/1944 | Cuozzo |
| 3,329,983 | A | 7/1967 | Clamp |
| 3,667,883 | A | 6/1972 | Ludwig |
| 3,696,456 | A | 10/1972 | Dunham et al. |
| 3,961,390 | A | 6/1976 | Giordano |
| 3,972,086 | A | 8/1976 | Belli et al. |
| 4,068,995 | A | 1/1978 | Hayashi et al. |
| 4,181,994 | A | 1/1980 | Gruber |
| 4,266,312 | A | 5/1981 | Hall |
| 4,447,967 | A | 5/1984 | Zaino |
| 5,128,880 | A | 7/1992 | White |
| 5,205,232 | A | 4/1993 | Sadeh et al. |
| 5,216,594 | A | 6/1993 | White et al. |
| 5,231,723 | A | 8/1993 | White et al. |
| 5,255,352 | A | 10/1993 | Falk |
| 5,339,252 | A | 8/1994 | White et al. |
| 5,345,638 | A | 9/1994 | Nishida |
| 5,361,133 | A | 11/1994 | Brown et al. |
| 5,537,946 | A | 7/1996 | Sadeh et al. |
| 5,671,055 | A | 9/1997 | Whittlesey et al. |
| 5,714,098 | A | 2/1998 | Potter |
| 5,885,500 | A | 3/1999 | Tawney et al. |
| 6,085,126 | A | 7/2000 | Mellgren et al. |
| 6,353,770 | B1 | 3/2002 | Ramsey et al. |
| 6,367,397 | B1 | 4/2002 | Musco et al. |
| 6,473,667 | B1 | 10/2002 | Lee |
| 6,558,784 | B1 | 5/2003 | Norton et al. |
| 6,741,728 | B1 | 5/2004 | Genest |
| 6,755,141 | B2 | 6/2004 | Musco et al. |
| 6,879,945 | B1 | 4/2005 | Cook |
| 7,146,751 | B2 | 12/2006 | Seamans |
| 7,552,494 | B2 | 6/2009 | Peterson |
| 7,818,217 | B2 | 10/2010 | Jones et al. |
| 8,162,022 | B2 | 4/2012 | Hull et al. |
| 8,348,371 | B2 | 1/2013 | McDowell et al. |
| 8,701,232 | B1 | 4/2014 | Droege et al. |
| 8,701,733 | B2 | 4/2014 | Leedy |
| 8,751,320 | B1 | 6/2014 | Kemist |
| 8,755,925 | B2 | 6/2014 | Regan et al. |
| 9,005,710 | B2 | 4/2015 | Jones et al. |
| 9,024,939 | B2 | 5/2015 | Sabiston et al. |
| 9,070,160 | B2 | 6/2015 | Dirsa et al. |
| 9,201,413 | B2 | 12/2015 | Hanft |
| 9,447,532 | B2 | 9/2016 | Jurkovic et al. |
| 9,681,709 | B2 * | 6/2017 | Manz ................... A43D 117/00 |
| 2002/0138923 | A1 | 10/2002 | Shaffeeullah |
| 2003/0110582 | A1 | 6/2003 | Torielli et al. |
| 2004/0143452 | A1 | 7/2004 | Pattillo et al. |
| 2004/0168329 | A1 | 9/2004 | Ishimaru |
| 2005/0049816 | A1 | 3/2005 | Oda et al. |
| 2005/0071242 | A1 | 3/2005 | Allen et al. |
| 2005/0089822 | A1 | 4/2005 | Geng |
| 2006/0123567 | A1 | 6/2006 | Morlacchi |
| 2006/0143839 | A1 | 7/2006 | Fromme |
| 2006/0150399 | A1 | 7/2006 | Koyama |
| 2006/0155417 | A1 | 7/2006 | Cremaschi et al. |
| 2008/0028544 | A1 | 2/2008 | Park |
| 2008/0147219 | A1 | 6/2008 | Jones et al. |
| 2008/0189194 | A1 | 8/2008 | Bentvelzen |
| 2008/0257500 | A1 | 10/2008 | Palmer |
| 2009/0019648 | A1 | 1/2009 | Jones et al. |
| 2009/0113756 | A1 | 5/2009 | Chang |
| 2009/0208113 | A1 | 8/2009 | Bar |
| 2010/0017974 | A1 | 1/2010 | RongBo |
| 2010/0036753 | A1 | 2/2010 | Harvill et al. |
| 2010/0084083 | A1 | 4/2010 | Hull et al. |
| 2010/0115792 | A1 | 5/2010 | Muller |
| 2010/0238271 | A1 | 9/2010 | Pfeiffer et al. |
| 2010/0293075 | A1 | 11/2010 | Chen et al. |
| 2010/0318442 | A1 | 12/2010 | Paul et al. |
| 2010/0326591 | A1 | 12/2010 | Langvin et al. |
| 2011/0109686 | A1 | 5/2011 | McDowell et al. |
| 2011/0134123 | A1 | 6/2011 | Salcolm et al. |
| 2011/0232008 | A1 | 9/2011 | Crisp |
| 2012/0023686 | A1 | 2/2012 | Huffa et al. |
| 2012/0111487 | A1 | 5/2012 | Hull et al. |
| 2012/0255201 | A1 | 10/2012 | Little |
| 2013/0125319 | A1 | 5/2013 | Regan |
| 2013/0159866 | A1 | 6/2013 | Dirsa et al. |
| 2013/0283548 | A1 | 10/2013 | Wang |
| 2014/0000044 | A1 | 1/2014 | Boardman et al. |
| 2014/0189964 | A1 | 7/2014 | Wen et al. |
| 2014/0201024 | A1 | 7/2014 | Collier et al. |
| 2014/0237737 | A1 | 8/2014 | Regan et al. |
| 2014/0259459 | A1 | 9/2014 | Ianchulev et al. |
| 2014/0304792 | A1 | 10/2014 | Derchak et al. |
| 2014/0352173 | A1 | 12/2014 | Bell et al. |
| 2015/0101134 | A1 | 4/2015 | Manz et al. |
| 2015/0196098 | A1 | 7/2015 | Dirsa et al. |
| 2015/0201711 | A1 | 7/2015 | Jurkovic et al. |

FOREIGN PATENT DOCUMENTS

| | | |
|---|---|---|
| CN | 102802456 | 11/2012 |
| DE | 2845883 | 4/1980 |
| DE | 19700171 | 7/1998 |
| DE | 60318392 | 1/2009 |
| DE | 102009049776 | 6/2010 |
| DE | 102011009641 | 4/2013 |
| EP | 990399 | 4/2000 |
| EP | 1424021 | 6/2004 |
| EP | 1640144 | 3/2006 |
| EP | 2564719 | 3/2013 |
| EP | 2587436 | 5/2013 |
| EP | 2649898 | 10/2013 |
| EP | 2786670 | 10/2014 |
| EP | 2792264 | 10/2014 |
| EP | 2792265 | 10/2014 |
| EP | 2839755 | 2/2015 |
| GB | 1439101 | 6/1976 |
| GB | 2091535 | 8/1982 |
| WO | 9722273 | 6/1997 |
| WO | 9830121 | 7/1998 |
| WO | 9916250 | 4/1999 |
| WO | 9932276 | 7/1999 |
| WO | 2006048024 | 5/2006 |
| WO | 2008119683 | 10/2008 |
| WO | 2010037035 | 4/2010 |
| WO | 2013074958 | 5/2013 |

OTHER PUBLICATIONS

"Foot Orthosis: Fabrication (You Tube Video)", available online at https://www.youtube.com/watchv=pDhpinxntgo, published Apr. 11, 2013, 2 pages.
U.S. Appl. No. 14/514,081, Non-Final Office Action dated Oct. 11, 2016, 10 pages.

(56) References Cited

OTHER PUBLICATIONS

U.S. Appl. No. 14/514,081, "Notice of Allowance", dated Feb. 16, 2017, 5 pages.
German Patent Application No. 102013221018.3, Office Action dated Mar. 3, 2017, 4 pages.
German Patent Application No. 102013221018.3, Office Action dated Oct. 2, 2014, 6 pages.
European Patent Application No. 14188265.4, European Search Report dated Mar. 23, 2015, 6 pages.

* cited by examiner

TWO-DIMENSIONAL SHOE MANUFACTURING

CROSS REFERENCE TO RELATED APPLICATIONS

This application is a continuation of U.S. patent application Ser. No. 14/514,081, filed on Oct. 14, 2014, entitled TWO-DIMENSIONAL SHOE MANUFACTURING (allowed), which is related to and claims priority benefits from German Patent Application No. DE 10 2013 221 018.3, filed on Oct. 16, 2013, entitled SPEEDFACTORY 2D ("the 018 application"), each of which are hereby incorporated herein in their entireties by this reference.

FIELD OF THE INVENTION

The present invention relates to a method for the manufacture of a plurality of shoes, an apparatus to perform such method, as well as shoes manufactured by such method.

BACKGROUND

The manufacture and sale of sportswear entails a significant number of new product designs each year for manufacturers, which are essential to keep pace with the latest developments on the market or to promote development itself. Such designs comprise shoes, textiles and accessories in a plurality of models, designs, production options, coloring, sizing, etc., for example. In this regard, most of the new products are designed, modeled and tested digitally by 3D CAD/FEA (finite element analysis) systems today.

In order to bring a new product on the market, first samples are first made manually from the digital design drafts, typically in factories located at a different place than the development department that is responsible for the product design. As a result, it is often only after shipment, often via ship containers, and receipt of the real samples that the product designers are able to further optimize their digital drafts and return them to the factories. This process is repeated until the samples have the desired functionality, design, cost and quality and can then be released for serial production in the factories. This process often takes several weeks to months until a result is reached, and the entire delivery chain is very inflexible. Thus, a manufacturer is only able to react slowly to fast-moving, fashion market trends and demands. The benefit regarding speed gained by the use of CAD/FEA systems throughout is lost by the overall slow production processes by the factories all over the world.

It is therefore an object of the present invention to provide manufacturing methods and production means that allow to prompt, automatic, and/or local manufacture of a plurality of different prototypes and the like in order to proceed from the "idea to the product" more rapidly. Further, it is desirable that the manufacture of individual items, in particular customized individual items, small-scale series, or series be possible in an uninterrupted manner and be freely scalable so that the production of a (small-scale) series may be merely x times a single production step.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a method for the manufacture of a plurality of shoes comprises providing a plurality of first shoe components for the manufacture of the plurality of shoes, wherein at least one of the plurality of first shoe components is configured for a different shoe model from at least a second one of the plurality of first shoe components, moving the plurality of first shoe components with a transport belt comprising the plurality of first shoe components, and providing the plurality of shoes, wherein at least one of the plurality of shoes is a different shoe model from at least a second one of the plurality of shoes, wherein the method runs in an automated manner without manual intervention.

Providing the plurality of first shoe components for the manufacture of the plurality of shoes may comprise unrolling a spool comprising the transport belt and the plurality of first shoe components. In these embodiments, the transport belt and the plurality of first shoe components may be integrally manufactured together.

In some embodiments, the transport belt comprises flat regions, wherein the flat regions comprise one or more of the plurality of first shoe components. The transport belt may also comprise a textile base material. In certain embodiments, the textile base material comprises weft knitting, warp knitting, weaving, felting, needle punching, electro-spinning, or cross-plying of a source material. In other embodiments, the transport belt may comprise a base material which comprises a foil, a film, a synthetic composite, a multilayer laminate and/or leather.

Each of the plurality of first shoe components may comprise at least a part of a shoe upper.

According to certain embodiments of the present invention, a method for the manufacture of a plurality of shoes comprises providing a plurality of first shoe components for the manufacture of the plurality of shoes, wherein at least one of the plurality of first shoe components is configured for a different shoe model from at least a second one of the plurality of first shoe components, moving the plurality of first shoe components with a transport belt comprising the plurality of first shoe components, passing the transport belt through at least one processing station, processing at least a subset of the plurality of first shoe components in the at least one processing station, and providing the plurality of shoes, wherein at least one of the plurality of shoes is a different shoe model from at least a second one of the plurality of shoes, wherein the method runs in an automated manner without manual intervention.

In certain embodiments, processing at least the subset of the plurality of first shoe components in the at least one processing station comprises performing at least one of the following processing steps: screen printing, digital printing, dye sublimation, sublimation printing, pad printing, spraying on color, applying at least one color-changing material, applying at least one foil element, impregnating with a material, coating with a material, applying at least one glue, flocking, laser cutting, laser engraving, embroidering, thermoforming, locally melting, locally fusing, embossing, laser etching, or perfing.

In additional embodiments, processing at least the subset of the plurality of first shoe components in the at least one processing station comprises adding at least one second shoe component to at least the subset of the plurality of first shoe components. The at least one second shoe component may comprise at least one of an eyelet, heel cap, toe cap, decoration element, decoration stripe, friction element, abrasion protection element, rib element, reinforcement element, stiffening element, supporting element, cushioning element, or fiber element. In some embodiments, the at least one second shoe component is added to each of the subset of the plurality of first shoe components by at least one of gluing, welding, high frequency welding, ultrasonic welding, laser welding, pressing, sewing, screwing, riveting, melting together, clipping together, sealing, subjecting to a heat and pressure treatment, or subjecting to a steaming treatment.

In further embodiments, processing at least the subset of the plurality of first shoe components in the at least one processing station comprises separating at least the subset of the plurality of first shoe components from the transport belt. Separating the plurality of first shoe components from the transport belt may comprise performing at least one of the following processing steps: die cutting, CNC cutting, laser cutting, water jet cutting, melting out of a connecting element, or dissolving a connecting element.

According to some embodiments, passing the transport belt through the at least one processing station comprises forming the plurality of first shoe components into three-dimensional shapes. The plurality of first shoe components may each comprise a shaping element configured to facilitate forming each of the plurality of first shoe components into the three-dimensional shape. In certain embodiments, forming each of the plurality of first shoe components into the three-dimensional shape may comprise arranging each of the plurality of first shoe components on a respective last.

In some embodiments, each of the plurality of first shoe components comprise at least a part of a shoe upper.

According to certain embodiments of the present invention, a method for the manufacture of a plurality of shoes comprises providing a plurality of first shoe components for the manufacture of the plurality of shoes, wherein at least one of the plurality of first shoe components is configured for a different shoe model from at least a second one of the plurality of first shoe components, moving the plurality of first shoe components with a transport means comprising the plurality of first shoe components, and providing the plurality of shoes, wherein at least one of the plurality of shoes is a different shoe model from at least a second one of the plurality of shoes, wherein the method runs in an automated manner without manual intervention.

BRIEF DESCRIPTION OF THE DRAWINGS

In the following detailed description, various embodiments of the present invention are described with reference to the following figures.

BRIEF DESCRIPTION

Figure 1:
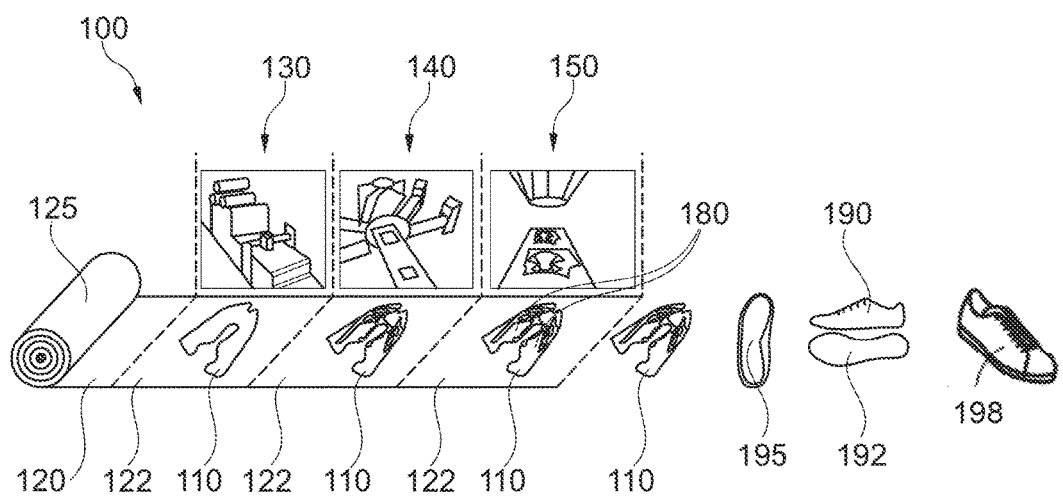
FIG. 1 is a schematic illustrating a method of manufacture of a plurality of shoes, according to certain embodiments of the present invention.

In accordance with a first aspect of the present invention, this object is at least partially achieved by a method for the manufacture of a plurality of shoes which comprises providing a plurality of first shoe components for the manufacture of a plurality of shoes and moving the plurality of the first shoe components with a transport means which is at least partially comprised of the plurality of first shoe components.

It has to be pointed out here already that although the embodiments of the invention are described in relation to sports shoes in the following, the present invention is not limited to these embodiments. Rather, the present invention can also be used for other types of sportswear, e.g. shirts, pants, gloves, etc. In addition, the invention may also be applied to the manufacture of sports equipment, such as balls, bags, backpacks, helmets, heads, belts, and other kind of accessories.

Moreover, embodiments of the method according to the invention may also run automatically to a large extent as well as that a certain amount of manual support work is carried out.

That is, embodiments of a method according to the invention may be carried out, at least predominantly, by robots, robotic systems or automated systems and/or the embodiments can include a certain amount of human (support) work. The robots, robotic systems or automated systems may further by equipped with hardware and/or software specifically adapted to the respective tasks or they may be general-purpose machines.

First of all, the provision of a plurality of first shoe components allows a subsequent individualization of the shoes to be manufactured by a suitable selection of further processing steps and processing parameters, for example from a plurality of the processing options discussed in the following. Taking the provided first shoe components as a basis and without these having to be already specifically manufactured for a corresponding shoe model and manually inserted into a machine, the manufacture of diversely designed shoes is thus possible in a manner that is automated to a large extent. In this regard, manufacture may, for example, be controlled directly via a computer, e.g. taking the CAD shoe models created on the computer as a basis.

In particular, the above mentioned further processing steps and processing parameters may be determined based on the computer generated shoe model or models. Herein, the determination of the necessary processing steps/parameters may be performed by the same computer on which the shoe models were generated. In this regard, "computer" comprises computers in the conventional sense as well as laptops, tablets, smartphones and other such portable or stationary devices. Or the data underlying the respective shoe model or models are sent to a control device by the computer, which then determines the necessary sequence of processing steps and the processing parameters to produce such shoes and controls the manufacture accordingly.

Such a computer could, for example, be located in some kind of "kiosk", where a potential customer can select or design a computer-generated shoe model and then cause the manufacture of a corresponding pair of shoes. Another possibility would be a fully automatic vending machine a customer could access also outside shopping hours, create his or her own shoe model, and have the corresponding shoe, or pair of shoes, manufactured at the spot for take away. This would allow selling and production of shoes in all areas outside opening hours, e.g. in cities, at airports, etc.

It is furthermore desirable in certain circumstances that the first shoe components form at least a portion of the transport means which is used to move the first shoe components to subject them sequentially to the selected processing steps referred to above, for example. This makes the necessity of a separate transport means, such as a band conveyor, at least partially redundant, on the one hand. On the other hand, the first shoe components may be integrated into the transport means or connected to it such that shifting, distorting, falling down, etc. of the first shoe components may be prevented, which significantly extends the possibilities for automated manufacture. This is the case, for example, because pliable materials, in particular textile pliable materials, which are typically difficult to be grasped or fixated by machine, are often used in the manufacture of shoes.

The transport means may comprise flat regions, wherein the flat regions comprise at least one of the first shoe components. The transport means may further comprise a transport belt.

Providing the first shoe components as part of at least one flat region of the transport means allows, in a particularly simple manner, processing the first shoe components, as further described below, by machine/robot/robotic systems and in a manner that is automated to a large extent. In this context, it is possible to manufacture a plurality of different shoe types and models by individually selecting at least one of the processing options described below. In this regard, a transport belt may be desirable with respect to automated, independent, continuous manufacture of shoes.

The transport belt may be rolled off a spool which comprises a plurality of first shoe components.

By rolling the transport belt off a spool, manual placement of the first shoe components becomes redundant to a large extent, which promotes automation of the manufacturing method. Only if, for example, a spool runs short and/or a spool with different first shoe components is to be used, does a new spool have to be inserted into a production means. However, this may also be carried out automatically. For example, the respective spool can automatically be taken from a spool stock and then be inserted into a production means. If desired, the transport belt may be supported by a conveyer belt within a production site to further facilitate manufacture.

In certain embodiments, the transport belt may be placed in a storage container in a folded manner and is taken from the latter. The manufacturing process could, for example, be sheet-based, e.g. when leather or other sheet-based materials are employed that may be taken from a sheet stock. Such a sheet based manufacturing process might be beneficial for more rigid materials like polycarbonates or composites, etc., and there may be other benefits for using sheet stock over rolls in smaller scale in-store customized manufacturing, for example. The individual sheets could, for example, be connected by a flexible material like paper and be stored in form of a sheet stock as described above, from which they are taken one after the other.

In certain embodiments, providing a plurality of first shoe components for the manufacture of the plurality of shoes comprises the joint production of the transport means with the plurality of first shoe components.

This allows even greater flexibility of the method, since for example changing or renewing the spool as described above may be omitted. Rather, the transport means together with the first shoe components may be provided directly as desired in each case. This may also entail material reduction since the design of the transport means may be adjusted to the respective shape of the first shoe components.

The transport means may further comprise a textile base material. This particularly applies for the first shoe components. In this regard, the manufacture of the textile base material may further comprise weft knitting, warp knitting, weaving, felting, needle punching, electro-spinning or cross-plying of a source material.

Today, textile materials play an important role in the sporting goods industry. It may be desirable in certain embodiments if particularly the first shoe components comprise a textile material. Further, if the entire transport means comprises a textile material, e.g. the same or a similar textile material as the first shoe components, the first shoe components may be fixed to the transport means or integrated into it particularly well. This is particularly applicable for the case in which providing a plurality of first shoe components comprises the joint production of the transport means with the plurality of first shoe components. For the manufacture of the textile base material and, if applicable, the entire transport means, the techniques of weft knitting, warp knitting, weaving, felting, needle punching, electro-spinning, or cross-plying of a source material come into consideration, since the textile materials manufactured by these techniques are able to provide certain desirable properties for the manufacture of shoes. Examples of such properties include high stability, low weight and good breathability as well as suitability for printing, suitability for application of markers for handling or post-processing and suitability for post-processing treatment.

In certain embodiments, the transport means comprises a base material which comprises a foil, a film, a synthetic composite, a multilayer laminate and/or leather. This particularly applies for the first shoe components.

The foil, film, synthetic composite, multilayer laminate and/or leather may serve the purpose of attributing further desirable properties to the first shoe components or the transport means, such as higher stability, abrasion resistance, increased wear comfort, weight reduction, etc., for example.

At this point it is mentioned that whenever the singular (i.e. "a foil", etc.) is used in this application, the plural is always also included, unless explicitly stated otherwise.

The transport means may also pass through at least one processing station in which the first shoe components are processed.

For example, the first shoe components may automatically be transported to at least one processing station, in which they are further processed. In certain embodiments, for example, individual first shoe components may pass through at least one processing station without being processed further there, so that an individual sequence of processing steps may be configured for every first shoe component as a result. A plurality of processing steps may be carried out within one processing station, with the exact sequence of processing steps and processing parameters to be individually adjusted for every first shoe component. All this may happen automatically to a large extent.

In the at least one processing station, at least one of the following processing steps may be performed: screen printing, digital printing, dye sublimation, sublimation printing, pad printing, spraying on color, applying at least one color-changing material, applying at least one foil element, impregnating with a material, coating with a material, applying at least one glue, flocking, laser cutting, laser engraving, embroidering, thermoforming, locally melting, locally fusing, embossing, laser etching, perfing.

It is therefore possible to individually impart a plurality of e.g. physical, optical and haptic properties onto the first shoe components, without a modification of a production means or an alteration of the method becoming necessary for this. Furthermore, apertures for shoelaces or better ventilation may be made, for example.

The at least one processing station may also add at least one second shoe component respectively to each of at least a subset of the first shoe components.

By adding at least one second shoe component to at least one of the first shoe component, the number of possible manufacture forms which may be manufactured by certain embodiments of the present method is increased further. In this regard, the addition of at least one second shoe component and the above-mentioned processing steps which may be carried out in the at least one processing station complement each other, so that the resulting possible selection from different combinations of processing possibilities and processing steps significantly increases the number of producible designs once more.

The at least one second shoe component may comprise at least one of the following shoe elements: eyelets, heel caps, toe caps, decoration elements, decoration stripes, friction elements, abrasion protection elements, rib elements, reinforcement elements, stiffening elements, supporting elements, cushioning elements, fiber elements.

On the one hand, such functional and decorating elements can serve the purpose of influencing the wearing properties of a shoe so that the individually controllable addition of such components allows producing a plurality of shoes for the most different purposes by certain embodiments of the present method. Moreover, they may further influence the overall shape, anatomical customization to a future wearer and general appearance of the shoes.

The at least one processing station may also be provided to connect the second shoe components with the respective first shoe components by at least one of the following steps: gluing, welding, high frequency welding, ultrasonic welding, laser welding, pressing, sewing, screwing, riveting, melting together, clipping together, sealing, subjecting to a heat and pressure treatment, and/or subjecting to a steaming treatment.

Depending on the materials of the first and/or second shoe components, at least one of the above-mentioned connecting methods may be used in this regard. This allows optimally adjusting the connecting method(s) to the respective properties of the shoe to be currently manufactured and the materials used and thus guaranteeing good stability.

The at least one processing station may moreover be provided to separate the first and/or second shoe components from the transport means.

This allows, if necessary, removing the first and/or second shoe components from the transport means for further processing elsewhere or for packaging for shipping or the like. The separation particularly allows subsequently putting the first and/or second shoe components into a three-dimensional shape.

It is possible, for example, that the separation of the first and/or the second shoe components may comprise at least one of the following steps: die cutting, CNC cutting, laser cutting, water jet cutting, melting out of a connecting element, and/or dissolving a connecting element.

These possibilities are particularly suitable for automated production since they may be or are already adjusted to the object that is currently to be separated in a very flexible and individual manner.

Furthermore, the at least one processing station may also be provided to put the first shoe components and/or second shoe components into a three-dimensional shape.

This may be carried out after the first and/or second shoe components have been separated from the transport means. By three-dimensional shaping, the first and/or second shoe components may already be put into their final shape, which they will also have in the completely manufactured shoe, or they may be given a preliminary shape, which will then be changed in further processing steps.

In some embodiments, the first shoe components and/or second shoe components, or at least some of them, may comprise a shaping element which is provided to facilitate the generation of the three-dimensional shape.

Due to the fact that textile, pliable materials, for example, are difficult to handle automatically or by machine, this offers a further possibility of supporting automated production. For example, the first and/or second shoe components, or some of them, may have a respective rubber-band element or spring element which is under strain before separation from the transport means, which puts the respective first and/or second shoe component into a three-dimensional preliminary shape after separation, and thus facilitates further processing, e.g. a final three-dimensional shaping.

Three-dimensional shaping can further comprise arranging the first shoe components, together with their respective second shoe components if present (i.e. if previously added), on a respective last each.

This ensures that the three-dimensional shaping is carried out in the desired manner, without the occurrence of undesired deformations such as bulges, corners, edges, distortions or warping in the material of the first and/or second shoe component, for example. The arrangement on a last additionally allows further transporting the three-dimensionally shaped first shoe components, together with their potentially added respective second shoe components, in a simple manner, if necessary.

The first shoe components may comprise at least a part of a shoe upper.

Taking at least a part of shoe upper as a basis is particularly beneficial for building the shoe stepwise by further processing steps as described herein.

At this point, it is explicitly pointed out that the exact selection of processing steps from the available processing options and their sequence can in certain embodiments of the inventive method be controlled individually for every first shoe component provided, and that a further individual selection may additionally be possible within each processing step. It is, for example, possible for the number and type of the second shoe components to be individually selected, for the decoration and optical design to be individually determined, etc.

A further aspect of the invention is an apparatus provided for performing certain embodiments of an inventive method.

With certain embodiments of such an apparatus, a plurality of differently designed shoes may be manufactured automatically to a large extent, as already discussed above, starting from the first shoe components provided.

The apparatus may also comprise a control means for the manufacture of different shoes with certain embodiments of one of the methods described herein. The control means may comprise an interface for interaction with at least one future wearer of one of the plurality of shoes in this context.

The control means can, for example, have recourse to at least one computer-generated shoe model, e.g. CAD models, and determine the required sequence and/or rearrangement of processing steps and processing parameters from these models. Thereafter, the control means can cause the transport means and/or the at least one processing station to move, place or process a given first shoe component such that a shoe corresponding to the computer-generated shoe model is manufactured. In the process, the control means can individually determine the sequence and/or rearrangement of processing steps and processing parameters for each first shoe component provided, for example in the manufacture of prototypes or whenever a future wearer of the shoe has "tailor-made shoes" manufactured by an input via the interface. Alternatively, the sequence of processing steps and processing parameters is determined for a plurality, e.g. a plurality of successive, first shoe components, for example for production in (small-scale) series.

The method may particularly run in an automated manner to a large extent in a manufacturing or processing apparatus (see below), without manual intervention or an alteration of the apparatus being necessary for the manufacture of different shoe models or prototypes.

The apparatus may be arranged inside a movable container. In certain embodiments, the container is at least partially transparent.

This allows transportation and provision of the apparatus directly "on site", for example at sporting events or in a sales outlet, etc. A purchaser may then, particularly in combination with the aforementioned interface for interaction, "put together" a desired shoe model directly at the site of the apparatus or even beforehand via the internet or the like, this model then being manufactured by the portable manufacturing device. If the container is partially transparent, the customer can even watch the shoes being manufactured. In addition, the process could be captured by video and live broadcasted in digital media networks/channels.

A further aspect of the present invention involves a shoe, the shoe having been manufactured using certain embodiments of a method according to the invention.

As already repeatedly mentioned, it is possible, in this respect, for each of the plurality of shoes manufactured to be individually customized and modified, for example based on a design of a development designer, a wearer's anatomy or even based on a customer's wishes.

At this point, it should again be explicitly pointed out that for embodiments of an inventive method, embodiments of an inventive apparatus and/or embodiments of an inventive shoe a plurality of design possibilities and embodiments disclosed herein may be combined with one another depending on the specific requirements. Individual options and design possibilities described herein can also be disregarded where they appear to be dispensable for the respective method, the respective apparatus or the shoe to be manufactured, with the resulting embodiments still being part of the invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Certain embodiments of the invention are described in the following detailed description with regard to sports shoes. The present invention is not, however, limited to these embodiments. Rather, the present invention may also be used in other types of sportswear, e.g. sports shirts, sports pants, gloves, etc.

FIG. 1 shows certain embodiments of a method 100 according to the invention for the manufacture of a plurality of shoes 198. In certain embodiments, the method 100 first comprises the following steps: providing a plurality of first shoe components 110 for the manufacture of a plurality of shoes 198, wherein at least one of the plurality of first shoe components 110 is configured for a different shoe model from at least a second one of the plurality of first shoe components 110, moving the plurality of first shoe components 110 with a transport means 120, which at least partially comprises the plurality of first shoe components 110, and providing the plurality of shoes 198, wherein at least one of the plurality of shoes 198 is a different shoe model from at least a second one of the plurality of shoes 198, wherein the method runs in an automated manner without manual intervention.

In the method 100 shown in FIG. 1, the first shoe components 110 are parts of shoe uppers 190. In other embodiments, the first shoe components 1100 may be parts of other shoe components, e.g. sole units 192 or the like.

The transport means 120 comprises flat regions 122, wherein the flat regions 122 comprise at least one of the first shoe components 110. In certain embodiments of the method 100, as shown in FIG. 1, each flat region 122 comprises one first shoe component 110. However, in other embodiments, at least one flat region 122 may comprise a plurality of first shoe components 110, wherein the number of first shoe components 110 per flat region 122 may vary as needed or desired. In certain embodiments, at least one of the plurality of first shoe components 110 may be configured for a different shoe model from at least a second one of the plurality of first shoe components 110.

In the method 100, as shown in FIG. 1, the transport means 120 is further provided as transport belt 120. A person of ordinary skill in the relevant art will understand that the transport means 120 may be any suitable conveying device including but not limited to air tables, gravity roller conveyors, band conveyors, belt conveyors, bucket conveyors, vibrating conveyors, chain conveyors, screw conveyors, robotic arms or the like which grips the workpiece, or other similar mechanical, pneumatic, and/or electrical conveying devices.

As can be seen in FIG. 1, the transport belt 120 and the plurality of first shoe components 110 may be provided by unrolling a spool 125 comprising the transport belt 120 and the plurality of first shoe components 110. In this context, it may be desirable in certain embodiments that the transport means 120 and the plurality of first shoe components 110 are integrally manufactured together. In other embodiments, the transport means 120 and the plurality of first shoe components 110 may be manufactured separately and subsequently joined together and rolled to form a spool 125.

In this regard, the transport means 120 and particularly the first shoe components 110 may comprise a textile base material, for example. The manufacture of the textile base material may entail, for example, weft knitting, warp knitting, weaving, as well as felting, needle punching, electro-spinning, cross-plying or other methods for the manufacture of nonwoven material, and both natural and synthetic base materials may be used. In other embodiments, the transport means 120 and particularly the first shoe components 110 may comprise synthetic materials, leather, foils, films, synthetic composites, multilayered laminates, carrier foils or dissolvable materials. Such dissolvable materials could be removed again, e.g. in a later processing step, and thus serve as support material.

It is also possible for the transport means 120 and particularly some or all of the first shoe components 110 to comprise a shaping element, which is provided to facilitate a subsequent step of adding a three-dimensional shape to the first shoe components 110. This shaping element may comprise, for example, a type of rubber, elastic or shape-memory material, which assumes a desired three-dimensional shape under the influence of energy and/or heat, for example. It is further possible for the shaping element to remain in the shoe to be manufactured as a structural element. Alternatively, the shaping element may also be removed after the three-dimensional shaping of the first shoe components 110 is complete.

When the transport means 120 and particularly the first shoe components 110 comprise a woven, warp-knitted and/or weft-knitted material, different yarns may be used in different regions to influence the functionality of the shoes 198 to be manufactured. These yarns may, for example, be yarns comprising thermoplastic material that are thermoformable, elastic yarns, metallic yarns, rubber yarns, bio-based yarns, etc.

In certain embodiments, different colors, shapes and functions, such as e.g. ventilation apertures, may be added at this stage. The transport means 120 and the first shoe components 110 may also be provided in different thicknesses to achieve a cushioning effect, for example. The transport means 120 and the first shoe components 110 may, for example, be weft-knitted, warp-knitted or woven with thicker yarn and/or a more voluminous patterns in places that will eventually form parts of the finished shoes 198 in which the wearer's foot is to be protected from discomfort caused by pressure points at the edge of inelastic materials or the effect of excessively strong force, e.g. when kicking a ball. The spool 125 may be manufactured in various sizes, depending on the size of the shoes 198 to be manufactured.

According to certain embodiments of the method 100, as shown in FIG. 1, the transport means 120 also passes through at least one processing station in which the first shoe components 110 are processed. FIG. 1 shows three processing stations 130, 140 and 150.

In the processing station 130, at least one of the following processing steps is performed to at least a subset of the plurality of first shoe components 110: screen printing, digital printing, dye sublimation, sublimation printing, pad printing, spraying on color, applying at least one color-changing material, applying at least one foil element, impregnating with a material, coating with a material, applying at least one glue, flocking, laser cutting, laser engraving, embroidering, thermoforming, locally melting, locally fusing, embossing, laser etching, 3-D printing, and/or perfing. Thus, for example, it is possible to spray pigments on the first shoe components 110 first and then apply glue in various regions or patterns. In doing so, the glue bonds with the pigments. Subsequently, a transfer paper, for example, may be applied, which also adheres to the glue, and when this transfer paper is subsequently removed, the glue and the pigments adhering thereto are therefore also removed. As a result, the regions in which no glue was applied are colored. A material, e.g. color, may also be applied all over the first shoe components 110, but only activated locally, e.g. by applying heat or energy. A further possibility involves applying pigments that change color depending on a magnetic field applied. These pigments may be embedded in a plastic carrier, a thermoplastic carrier material or in microcapsules.

In certain embodiments of the method 100, as illustrated in FIG. 1, when the transport belt 120 passes through the processing station 140, at least one second shoe component 180 is added to each of at least a subset of the first shoe components 110. It is to be noted here that, in FIG. 1, each of the first shoe components 110 is shown prior to performance of the respective processing steps within the associated processing station. Therefore, the result of each such processing step can only be seen "one station later."

Whether at least one second shoe component 180 is added to a given first shoe component 110 may be controlled individually for each first shoe component 110. The at least one second shoe component 180 may comprise at least one of the following shoe elements: an eyelet, heel cap, toe cap, decoration element, decoration stripe, friction element, abrasion protection element, rib element, reinforcement element, stiffening element, supporting element, cushioning element, fiber element. The at least one second shoe component 180 may comprise as many of these shoe elements in any suitable combination as needed or desired.

In certain embodiments, the second shoe components 180 may be prefabricated and applied to the first shoe components 110 at the processing station 140. Suction elements, gripping elements or magnetic instruments, for example, may be used for the application. It is also possible for the second shoe components 180 to be provided on a separate carrier film. In some embodiments, the second shoe components 180 may be applied to the first shoe components 110 by a printing method. In further embodiments, glue may be applied to the first shoe components 110 in particular regions, and fibers or such elements may be subsequently applied to these particular regions. Superfluous fibers, which did not bond with the glue, may subsequently be blown off, for example. Some or all of the second shoe components 180 may also comprise a shaping element, as already mentioned above, which facilitates imparting a three-dimensional shape to the first shoe components 110.

Before applying at least a second shoe component 180 to a respective first shoe component 110, the first and second components 110, 180 may be aligned relative to each other to achieve a correct placement of the second component(s) 180 on the first component 110. This alignment may be aided or performed by using markers, recognition of different material characteristics or pattern recognition. The whole process could furthermore be controlled with digital processing of images. For example, digital cameras may be installed along the manufacturing lane and the images get processed to determine the size and orientation of the different shoe components.

According to certain embodiments, the first shoe components 110 of the method 100, as shown in FIG. 1, further pass through a third processing station 150. In the station 150, a consolidating or connecting method is performed to connect the second shoe components 180 with the respective first shoe components 110 by at least one of the following processing steps: gluing, welding, high frequency welding, ultrasonic welding, laser welding, pressing, sewing, screwing, riveting, melting together, clipping together, sealing, subjecting to a heat and pressure treatment, and/or subjecting to a steaming treatment.

For example, the first shoe components 110 and the second shoe components 180 may be subjected to pressure and heat so that all adhesive layers present are activated, creating a resilient connection between the various layers. Also, there could be a number of separate heat pressing steps, for example two heat pressing steps or four heat pressing steps or the like, at the same or at different temperatures. For example, the temperature at a first heat pressing step could be higher or lower than the temperature at a second heat pressing second step and so on. In some embodiments, an uppermost layer of glue may be applied or the first and/or second shoe components 110, 180 may be covered with a thin coating, e.g. a polymer coating.

After this consolidating and/or connecting step, the first and/or the second shoe components 110, 180 may be separated from the transport means 120. This separation may take place at a further processing station (not shown) or at the processing station 150.

In certain additional embodiments, the base material of the first shoe components 110 may be fused and/or melted, thereby changing the properties of the first shoe components 110 without necessarily requiring incorporation of the second components 180. Such a step may be performed in addition to or as an alternative to adding and consolidating the second components 180 with the first shoe components 110.

It should generally be noted that the processing stations 130, 140 and 150 may also be a single processing station comprising several substations, for example, or at least one processing tool that is selected according to the processing steps to be performed. Moreover, the order of the processing stations 130, 140, 150 and processing steps may also be different than described herein.

The separation of the first and/or the second shoe components 110, 180 may comprise at least one of the following steps: die cutting, CNC cutting, laser cutting, water jet cutting, melting out of a connecting element and/or dissolving a connecting element. Particularly if the first shoe components 110 are produced together with the transport means 120, e.g. by weaving, weft knitting or warp knitting, it is possible for the first shoe components 110 to be, for example, surrounded by a thin fiber or a chemically dissolvable fiber or the like, which is severed or dissolved to separate the components. For this, it may be desirable in certain embodiments for the first shoe components 110 to be connected with the transport means 120 by a single fiber, such that this single fiber may be severed or dissolved to separate the first shoe components 110. In certain embodiments, a meltable fiber be used, with the fiber melting at relatively low temperatures, thereby enabling the first shoe components 110 to be separated. A relatively low temperature here means a temperature lower than 100°, lower than 150° or lower than 200°, for example.

After separation, the first and/or second shoe components 110, 180 may pass through a further processing station (not shown), which is provided to impart a three-dimensional shape to the first shoe components 110 and/or second shoe components 180. This step may again be a separate processing station or one of the processing stations 130, 140, 150, at which at least one of the previous processing steps was already performed. In the case of a separate processing station, the separated first and/or second shoe components 110, 180 must be moved to this station, which may be done either automatically and mechanically or manually.

In order to facilitate the putting into a three-dimensional shape, it may be desirable in certain embodiments for the first and/or the second shoe components 110, 180, as already described further above, to comprise a shaping element. As already mentioned, this shaping element may be a rubber-band element or a spring element, for example, and, after imparting a three-dimensional shape to the first and/or second shoe components 110, 180, the shaping element may either remain on the workpiece or be removed. In certain embodiments in which the first shoe components 110 constitute at least a partial region of the shoe uppers 190, the step of imparting a three-dimensional shape may be accomplished by closing a seam at the heel, for example, with it also being possible to position the seam elsewhere as needed or desired. The seam may be closed by stitching, gluing, welding or any other method. Alternatively, different parts of the shoe uppers 190 may be sewn or welded together to achieve a three-dimensional shape. Strobel boards 195 and/or sole units 192, for example, may also be added at this point.

To further facilitate the three-dimensional shaping, the first shoe components 110, together with their previously added second shoe components 180 if applicable, may be arranged on a last (not shown), particularly when the first shoe components 110 are parts of shoe uppers 190. Further parts, for example sole units 192 or Strobel boards 195, may also be added at this stage. In certain embodiments, the last is an inflatable last. Thus a single last may be used for shoes 198 of different sizes and shapes. It is also possible, for example, that each or some of the lasts used are milled based on 3D CAD files, to achieve a particularly good customization of the finished products.

The steps described here for three-dimensional shaping and, where applicable, for applying further parts like sole units 192 or Strobel boards 195, may be performed manually or mechanically. Such steps may be performed, for example, at a processing station (not shown) comprising a mounting means, with the mounting means comprising a number of needles or the like, which interact with defined apertures in the first and/or second shoe components 110, 180. As a result, the first and/or second shoe components 110, 180 may be correctly arranged on the mounting means before imparting a three-dimensional shape and, for example, before addition of further parts like sole units 192 and/or Strobel boards 195 takes place.

Figure 2:
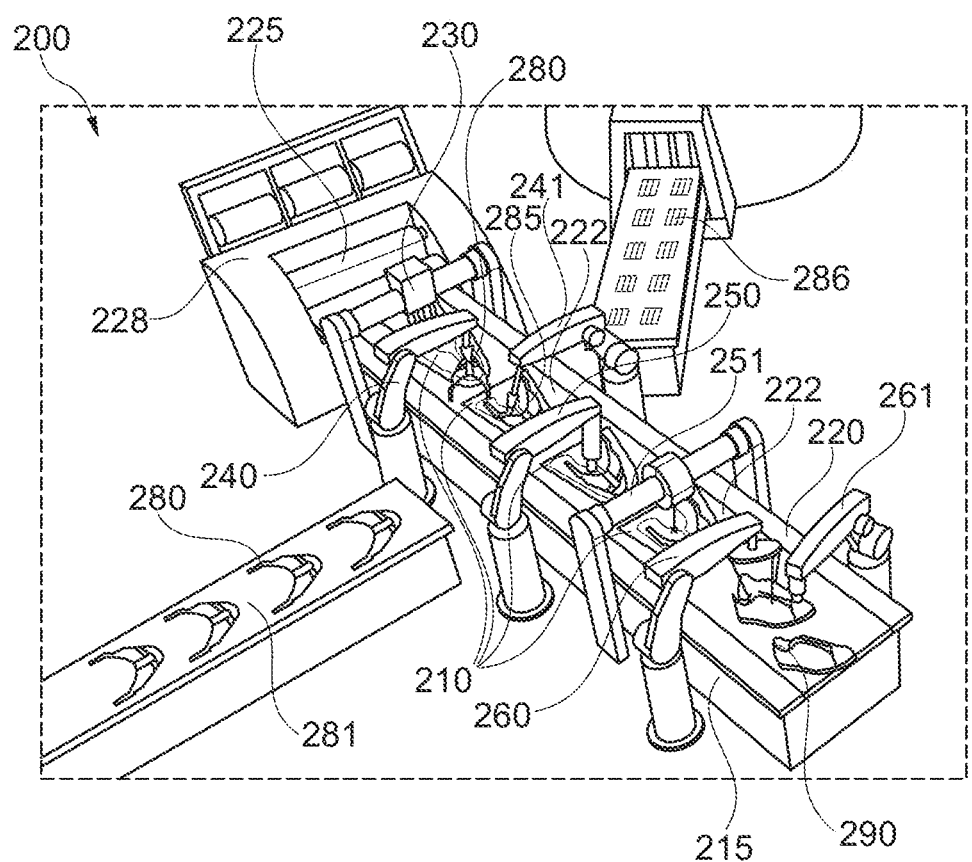
FIG. 2 is a perspective view of a method/apparatus for the manufacture of a plurality of shoes, according to certain embodiments of the present invention.

FIG. 2 shows further embodiments according to the invention or an apparatus for performing a method 200, respectively. For manufacturing a plurality of shoe uppers 290, a plurality of first shoe components 210 is first provided, which in the method 200 shown here are part of a shoe upper.

The plurality of first shoe components 210 is moved with a transport means 220, which at least partially comprises the plurality of first shoe components 210. Herein, the transport means 220 may comprise a plurality of flat regions 222, each of which may further comprise at least one first shoe component 210.

The transport means 220 also comprises a transport belt 225, with the transport belt 225 comprising a textile base material 225. A person of ordinary skill in the relevant art will understand that the transport means 120 may be any suitable conveying device including but not limited to air tables, gravity roller conveyors, band conveyors, belt conveyors, bucket conveyors, vibrating conveyors, chain conveyors, screw conveyors, robotic arms or the like which grips the workpiece, or other similar mechanical, pneumatic, and/or electrical conveying devices.

In the certain embodiments of the method 200, as shown in FIG. 2, the transport belt 225 is produced jointly with the first shoe components 210 in an apparatus 228 provided for this purpose. As a result, manufacturing within the apparatus 228 may comprise weft knitting, warp knitting, weaving, as well as felting, needle punching, electro-spinning or cross-plying of a source material. Further methods for the manufacture of nonwoven materials are also possible. Joint production of the transport belt 225 and first shoe components 210 enables the production and provision of the transport belt 225 and the plurality of first shoe components 210 with the precise properties that are desirable for the shoe uppers 290.

Herein, the transport means may be solely comprised of the transport belt 225 together with the first shoe components 210. However, the transport means 220 may also comprise further components, e.g. a foil or plastic layer, a film, a synthetic composite material, a multilayer laminate and/or leather or the like (not shown). After manufacture of the transport belt 225 together with the first shoe components 210, these additional elements may, for example, be arranged on the transport belt 225 and/or shoe components 210 and connected, glued, etc., thereto in the apparatus 228.

Incorporating the first shoe components 210 within the transport means 220 allows the first shoe components 210 to be very well positioned and moved along. For this purpose, the transport means 220 and the transport belt 225 may, for example, be laid over a roller table 215 or an air-bearing stage 215, such that the transport means 220 and the transport belt 225 do not sag.

In certain embodiments of the method 200, as shown in FIG. 2, the transport means 220 and the first shoe components 210 pass through a series of processing stations 230, 240, 241, 250, 251, 260 and 261.

For the processing station 230, the same basic considerations apply as for the processing station 130, which is shown in FIG. 1.

The processing stations 240 and 241, for which the same basic considerations also apply as for the processing station 140 shown in FIG. 1, at least one second shoe component 280, 285 is added to each of at least a subset of the first shoe components 210. The second shoe component 280 may be provided to the processing station 240 via a transport means 281. Similarly, the second shoe component 285 may be provided to the processing station 241 via a further transport means 286. A person of ordinary skill in the relevant art will understand that the transport means 120 may be any suitable conveying device including but not limited to air tables, gravity roller conveyors, band conveyors, belt conveyors, bucket conveyors, vibrating conveyors, chain conveyors, screw conveyors, robotic arms or the like which grips the workpiece, or other similar mechanical, pneumatic, and/or electrical conveying devices.

For example, the second shoe components 280 may be elements for reinforcement, whereas the further second shoe components 285 may be strip elements for decoration.

The statements already made above regarding the design possibilities for the second shoe components will be referred to in the following here.

After passing through the processing stations 240 and 241, the transport means 220 and the first shoe components 210, together with any second shoe components 280, 285 possibly added, pass through the processing station 250, which serves the purpose of consolidating and/or connecting the first and second shoe components 210, 280 and/or 285. The statements already made above regarding processing station 150 also apply analogously here.

The first and second shoe components 210, 280 and 285 are subsequently separated from the transport belt 225 at the processing station 251. In this context, the first and second shoe components 210, 280 and 285 may only be separated from the transport belt 225, while an underlying carrier layer of the transport means 220 remains intact and thus assures further conveyance of the shoe components to the processing stations 260 and 261.

Alternatively, the first and second shoe components 210, 280 and 285 may also be completely separated, e.g. cut out, but will initially remain within the transport belt 225 and the transport means 220 and be further transported, "carried along," as it were, by movement of the transport belt 225 and/or the transport means 220.

Furthermore, the transport means 220 and the separated first and second shoe components 210, 280 and 285 pass through the processing stations 260 and 261, which are provided to impart a three-dimensional shape to the shoe components 210, 280, 285. For this purpose, the shoe components may first be removed from the transport belt 225 and the transport means 220. Imparting the three-dimensional shape may then involve finishing, stitching or bonding at the heel or the like, for example.

Figure 3:
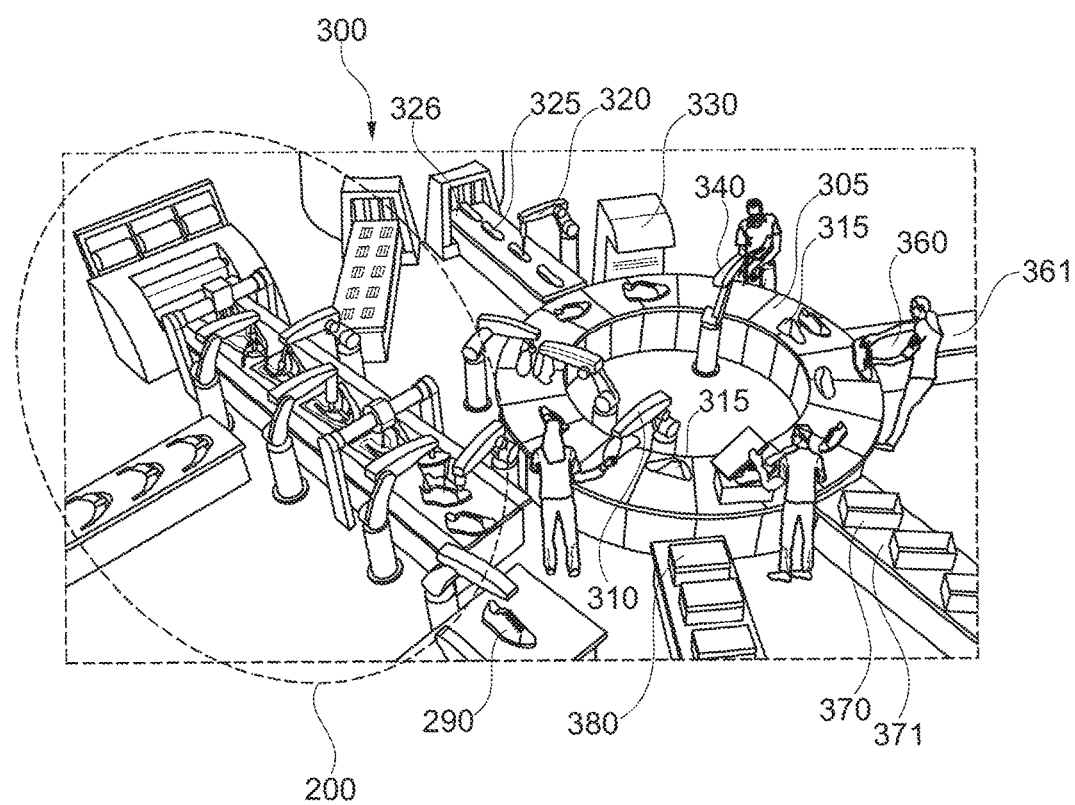
FIG. 3 is a perspective view of a method/apparatus for the manufacture of a plurality of shoes, according to certain embodiments of the present invention.

FIG. 3 shows further embodiments 300 of a method according to the invention for manufacturing a plurality of shoes or an apparatus for performing such a method. Herein, the method 200 just described may be seen in the left half of the image. Shoe uppers 290 manufactured thereby are now subjected to further processing steps for the manufacture of the plurality of shoes.

For example, the shoe uppers 290 may pass through a number of further processing stations 310, 330 and 340 and processing steps, along a further transport means 305, with it also being possible for some processing steps to be performed manually. A person of ordinary skill in the relevant art will understand that the transport means 120 may be any suitable conveying device including but not limited to air tables, gravity roller conveyors, band conveyors, belt conveyors, bucket conveyors, vibrating conveyors, chain conveyors, screw conveyors, robotic arms or the like which grips the workpiece, or other similar mechanical, pneumatic, and/or electrical conveying devices.

First, the shoe uppers 290 are mounted on lasts 315 at a processing station 310. This mounting may be done either mechanically or manually, with it also being possible for manual mounting to be supported by mechanical means. In further processing steps, the shoe uppers mounted on the last are provided with an outsole 325. The outsoles 325 may, for example, be provided via a further transport means 326 to the processing station 320, which applies an adhesive layer to the outsoles before the outsoles 325 are arranged on the shoe uppers 290. A person of ordinary skill in the relevant art will understand that the transport means 120 may be any suitable conveying device including but not limited to air tables, gravity roller conveyors, band conveyors, belt conveyors, bucket conveyors, vibrating conveyors, chain conveyors, screw conveyors, robotic arms or the like which grips the workpiece, or other similar mechanical, pneumatic, and/or electrical conveying devices. At a further processing station 330, setting of the adhesive layer, for example, may be effected, resulting in a resilient connection between the shoe upper 290 and the outsole 325. In some embodiments, the processing station 320 may apply a meltable material to the outsoles 325, which is at least partially melted and then cooled to form a connection between the shoe upper 290 and the outsole 325.

After the connection between the shoe upper 290 and the outsole 325 is formed, the shoe workpiece is further conveyed to another processing station 340, at which the last 315 is removed. This step may once again be done either purely by machine or manually, with it also being possible for manual removal to be supported by mechanical means.

After removal of the last, shoes laces 360, for example, may be threaded through the shoes, with it being possible for the shoe laces to be provided by a further transport means 361. A person of ordinary skill in the relevant art will understand that the transport means 120 may be any suitable conveying device including but not limited to air tables, gravity roller conveyors, band conveyors, belt conveyors, bucket conveyors, vibrating conveyors, chain conveyors, screw conveyors, robotic arms or the like which grips the workpiece, or other similar mechanical, pneumatic, and/or electrical conveying devices. In FIG. 3, the shoe laces are threaded manually; however, in certain embodiments, the shoe laces may be threaded mechanically.

The shoes thus completed can then be placed into the packaging 370, either mechanically or manually, at a further processing station, with it being possible for the packaging itself to be provided via a further transport means 371. A person of ordinary skill in the relevant art will understand that the transport means 120 may be any suitable conveying device including but not limited to air tables, gravity roller conveyors, band conveyors, belt conveyors, bucket conveyors, vibrating conveyors, chain conveyors, screw conveyors, robotic arms or the like which grips the workpiece, or other similar mechanical, pneumatic, and/or electrical conveying devices. The completely manufactured and packaged shoes 380 can then finally be loaded on a further transport means that further conveys the packaged shoes 380 either to a warehouse or directly to a store or sales counter.

The packaging 370 may also be customized with each box being individually printed, cut, and formed on demand. The customization may be purely visible in form of names, logos and so on, or may be designed perfectly to fit each shoe, or piece of apparel.

It should be noted here that the embodiments shown in FIGS. 1-3 are merely examples that are intended to make the invention's potential obvious to the person skilled in the art. In certain existing embodiments, the precise number, sequence and nature of the individual processing steps may also differ from the methods 100, 200 and 300 shown here.

Figure 4:
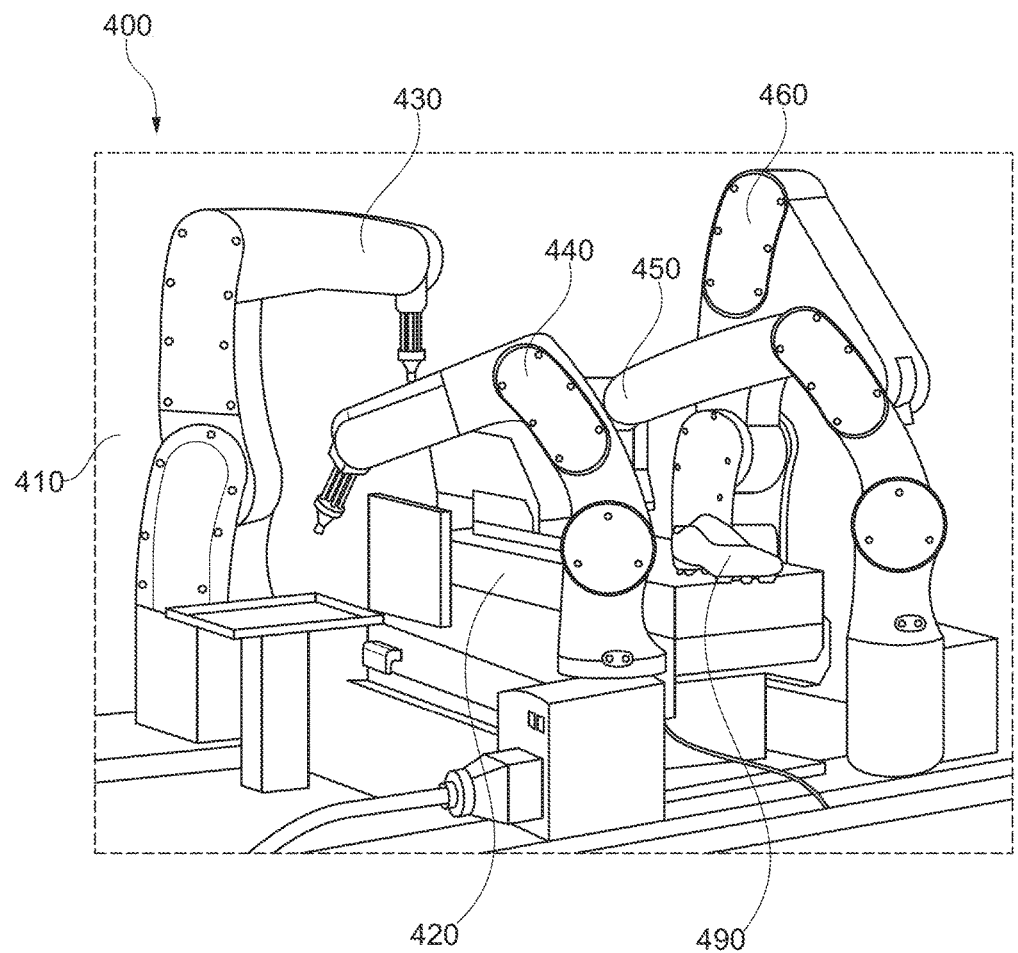
FIG. 4 is a perspective view of an apparatus arranged inside a transparent container, according to certain embodiments of the present invention.

FIG. 4 shows embodiments of an apparatus 400 for performing certain embodiments of a method according to the invention, e.g. one of the methods shown in FIGS. 1-3.

The apparatus 400 comprises a transport means 420, as well as a plurality of processing stations 430, 440, 450 and 460. A person of ordinary skill in the relevant art will understand that the transport means 120 may be any suitable conveying device including but not limited to air tables, gravity roller conveyors, band conveyors, belt conveyors, bucket conveyors, vibrating conveyors, chain conveyors, screw conveyors, robotic arms or the like which grips the workpiece, or other similar mechanical, pneumatic, and/or electrical conveying devices. Here, the transport means 420 and the processing stations 430, 440, 450 and 460 are arranged in a mobile container 410. The container 410 may also be a combination of multiple containers combined into one production unit. Regarding the design possibilities for the transport means 420 and the processing stations 430, 440, 450 and 460, reference is made to the corresponding statements above.

Here, the mobile container 410 may be at least partially transparent. In the present embodiments, the walls of the container 410 may be formed of glass or Plexiglas or other transparent materials. A shoe 490, which was manufactured with various embodiments of the apparatus 400, can also be seen.

The apparatus 400 may also comprise a control means (not shown), which facilitates the manufacture of a plurality of different shoes with the apparatus 400 shown. This control means may further comprise an interface for interaction with at least one future wearer of one of the shoes to be manufactured. This allows a future wearer to individually adapt the shoe 490 to be manufactured to their needs.

Figure 5:
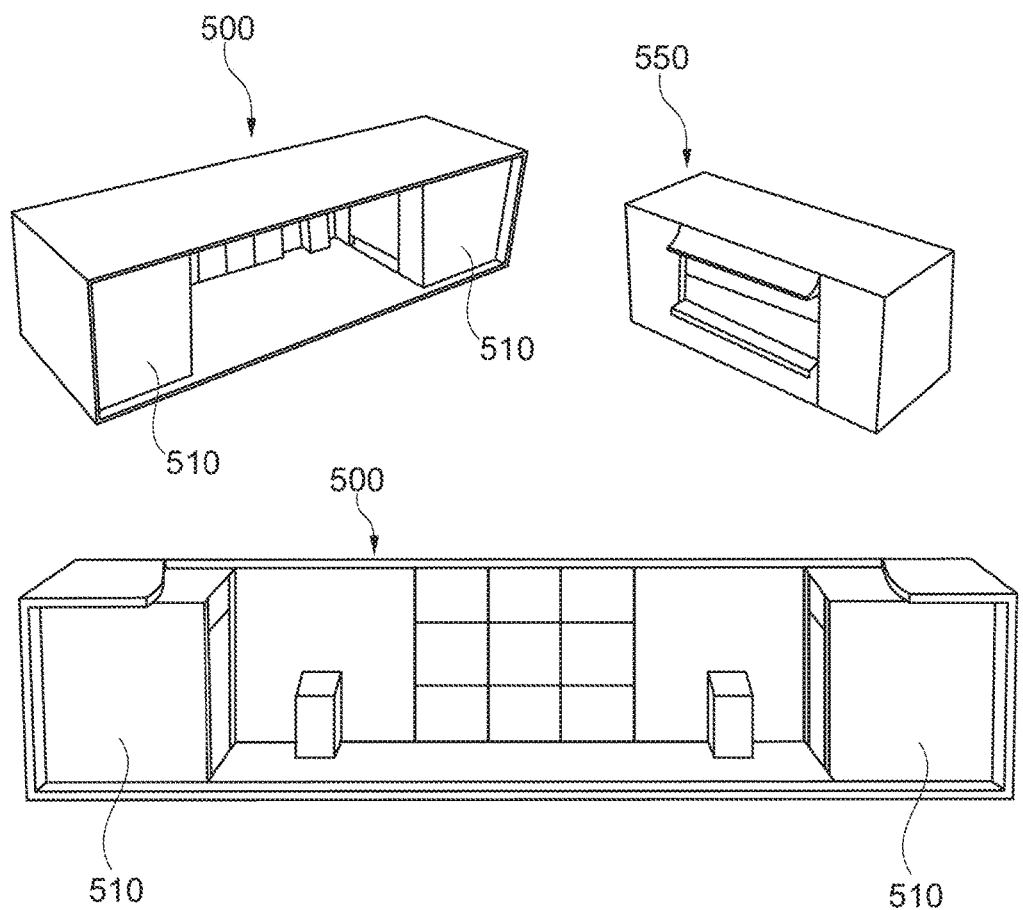
FIG. 5 are front and perspective views of a portable sales stand comprising an apparatus for the manufacture of a plurality of shoes, according to certain embodiments of the present invention.

FIG. 5 shows embodiments of a mobile sales stand 500, with the mobile sales stand 500 comprising at least one apparatus 510 for performing certain embodiments of a method according to the invention, e.g. one of the apparatuses 200, 300 and 400 shown in FIGS. 2-4. Furthermore, FIG. 5 shows a sales or consultancy stand 550. For example, at this consultancy stand 550, a customer can seek advice about suitable shoe models or the customer can individually design a desired shoe model. After designing the desired shoe model, the production apparatus 510 may, via the control means as described above, for example, be prompted to manufacture the shoe model designed by the customer.

The mobile sales stand 500 may be used, for example, at trade fairs, major events, sports events, etc. In certain embodiments, the mobile sales stand may be placed in a department store.

Figure 6:
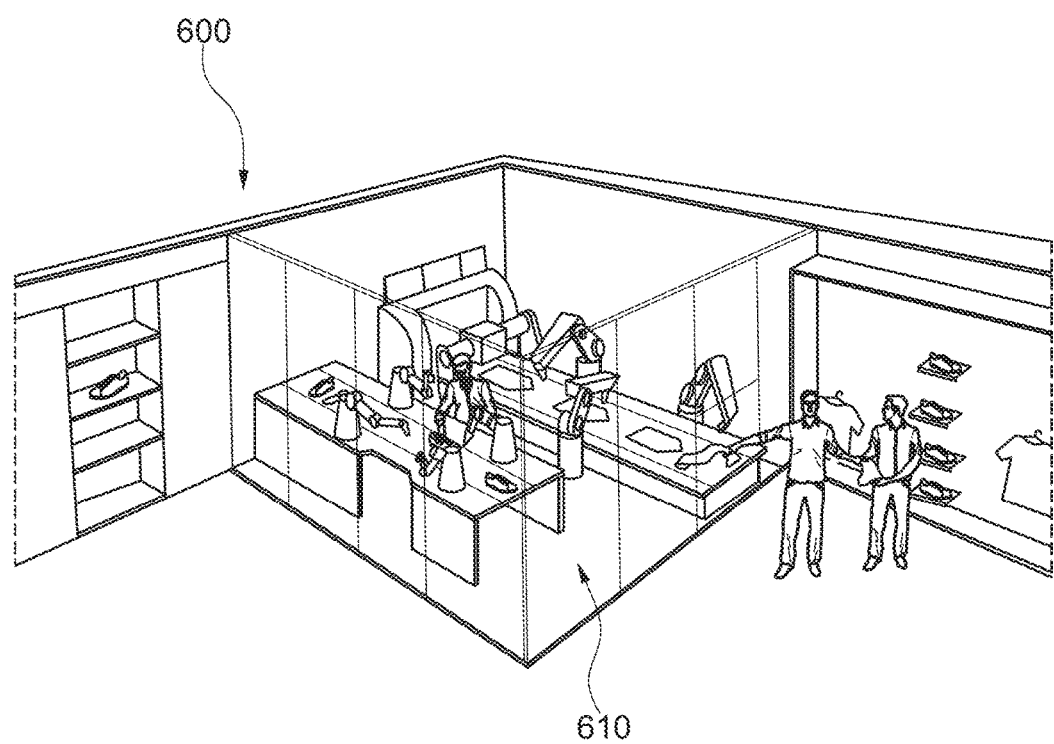
FIG. 6 is a perspective view of a business premises comprising an apparatus for the manufacture of a plurality of shoes, according to certain embodiments of the present invention.

Finally, FIG. 6 shows embodiments of a sales room 600 comprising an apparatus 610 for performing certain embodiments of a method according to the invention. Apparatus 610 may, for example, be one of the embodiments of an apparatus 200, 300 or 400 discussed in the context of FIGS. 2-4.

In the following, further examples are described to facilitate the understanding of the invention:

1. Method (100; 200; 300) for the manufacture of a plurality of shoes (198; 490), which comprises the following steps:
    a. Providing a plurality of first shoe components (110; 210) for the manufacture of the plurality of shoes (198; 490); and
    b. Moving the plurality of first shoe components (110; 210) with a transport means (120; 220; 420) which is at least partially comprised of the plurality of first shoe components (110; 210).
2. Method (100; 200; 300) according to the preceding example, wherein the transport means (120; 220) comprises flat regions (122; 222), wherein the flat regions (122; 222) comprise one or more of the first shoe components (110; 210).
3. Method (100; 200; 300) according to one of the preceding examples, wherein the transport means (120, 220) comprises a transport belt.
4. Method (100) according to the preceding example, wherein the transport belt (120) is rolled off a spool (125) which comprises a plurality of first shoe components (110).
5. Method (200) according to one of the preceding examples, wherein step a. comprises the joint manufacture of the transport means (220) with the plurality of first shoe components (210).

6. Method (100; 200; 300) according to one of the preceding examples, wherein the transport means (120; 220) comprises a textile base material.

7. Method (100; 200; 300) according to the preceding example, wherein the manufacture of the textile base material comprises the weft knitting, warp knitting, weaving, felting, needle punching, electro-spinning or cross-plying of a source material.

8. Method (100; 200; 300) according to one of the preceding examples, wherein the transport means (120; 220) comprises a base material which comprises a foil, a film, a synthetic composite, a multilayer laminate and/or leather.

9. Method (100; 200; 300) according to one of the preceding examples, wherein the transport means (120; 220; 420) passes through at least one processing station (130; 140; 150; 230; 240; 241; 250; 251; 260; 261; 430; 440; 450; 460) in which the first shoe components (110; 210) are processed.

10. Method (100; 200; 300) according to the preceding example, wherein in the at least one processing station (130; 230) at least one of the following processing steps is performed: screen printing, digital printing, dye sublimation, sublimation printing, pad printing, spraying on color, applying at least one color-changing material, applying at least one foil element, impregnating with a material, coating with a material, applying at least one glue, flocking, laser cutting, laser engraving, embroidering, thermoforming, locally melting, locally fusing, embossing, laser etching, perfing.

11. Method (100; 200; 300) according to one of the two preceding examples, wherein to each of a subset of the first shoe components (110; 210), the at least one processing station (140; 240; 241) adds at least one second shoe component (180; 280; 285).

12. Method (100; 200; 300) according to the preceding example, wherein the at least one second shoe component (180; 280; 285) comprises one or more of the following shoe elements: eyelets, heel caps, toe caps, decoration elements, decoration stripes, friction elements, abrasion protection elements, rib elements, reinforcement elements, stiffening elements, supporting elements, cushioning elements, fiber elements.

13. Method (100; 200; 300) according to one of the two preceding examples, wherein the at least one processing station (150; 250) is provided to connect the second shoe components (180; 280; 285) with the respective first shoe components (110; 210) by one or more of the following steps: gluing, welding, high frequency welding, ultrasonic welding, laser welding, pressing, sewing, screwing, riveting, melting together, clipping together, sealing, subjecting to a heat and pressure treatment, subjecting to a steaming treatment.

14. Method (100; 200; 300) according to one of the preceding examples 9-13, wherein the at least one processing station (251) is provided to separate the first and/or second shoe components from the transport means.

15. Method (100; 200; 300) according to the preceding example, wherein the separating comprises one or more of the following steps: die cutting, CNC cutting, laser cutting, water jet cutting, melting out of a connecting element, dissolving a connecting element.

16. Method (100; 200; 300) according to one of the preceding examples 9-15, wherein the at least one processing station (260; 261) is provided to put the first (110; 210) and/or second shoe components (180; 280; 285) into a three-dimensional shape.

17. Method (100; 200; 300) according to the preceding example, wherein the first (110; 210) and/or second shoe components (180; 280; 285) comprise a shaping element which is provided to facilitate the generation of the three-dimensional shape.

18. Method (300) according to one of the two preceding examples, wherein the putting into three-dimensional shape comprises arranging the first shoe components (110; 210), together with their respective second shoe components (180; 280; 285) if present, on a respective last (315) each.

19. Method (100; 200; 300) according to one of the preceding examples, wherein the first shoe components (110; 210) comprise at least a part of a shoe upper (190; 290).

20. Apparatus (200; 300; 400; 510; 610), provided to perform a method (100; 200; 300) according to one of the examples 1-19.

21. Apparatus (200; 300; 400; 510; 610) according to the preceding example, further comprising a control means for the manufacture of different shoes (198; 490) with a method (100; 200; 300) according to one of the examples 1-19.

22. Apparatus (200; 300; 400; 510; 610) according to the preceding example, wherein the control means comprises an interface for interaction with a future wearer of one of the plurality of shoes (198; 490).

23. Apparatus (400; 510) according to one of the three preceding examples, wherein the apparatus (400; 510) is arranged inside a movable container (410; 500).

24. Apparatus (400) according to the preceding example, wherein the movable container (410) is at least partially transparent.

25. Shoe (198; 490), wherein the shoe (198; 490) has been manufactured by use of a method (100; 200; 300) according to one of the examples 1-19.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A method for the manufacture of a plurality of shoes, the method comprising:

providing an automatically-driven transport belt comprising a knit material defining a plurality of flat regions that include at least a first flat region and a second flat region, the knit material further at least partially defining a plurality of primary shoe components for the manufacture of the plurality of shoes, wherein each of the plurality of primary shoe components comprise at least a part of a shoe upper, wherein the plurality of primary shoe components includes at least a first primary shoe component that is configured for a first shoe model and that is incorporated into the first flat region, wherein the plurality of primary shoe components further includes at least a second primary shoe component that is configured for a second shoe model and that is incorporated into the second flat region, the second shoe model being different from the first shoe model;

passing the automatically-driven transport belt through at least one first processing station comprising at least one first automated robotic system for adding secondary shoe components to the primary shoe components;

processing at least a subset of the plurality of primary shoe components in the at least one first processing station by at least:
  adding a first secondary shoe component to the first primary shoe component of the first flat region of the knit material of the transport belt through automated operation of the at least one first automated robotic system; and
  adding a second secondary shoe component to the second primary shoe component of the second flat region of the knit material of the transport belt through automated operation of the at least one first automated robotic system, wherein the second secondary shoe component is different than the first secondary shoe component based on the second shoe model being different from the first shoe model;

passing the automatically-driven transport belt through at least one second processing station comprising at least one second automated robotic system for connecting the secondary shoe components to the primary shoe components by welding;

processing at least a subset of the plurality of primary shoe components in the at least one second processing station by at least:
  connecting the first secondary shoe component to the first primary shoe component of the first flat region of the knit material of the transport belt by welding through automated operation of the at least one second automated robotic system; and
  connecting the second secondary shoe component to the second primary shoe component of the second flat region of the knit material of the transport belt by welding through automated operation of the at least one second automated robotic system wherein the first secondary shoe component is connected to the first primary shoe component by first welding that is different than second welding by which the second secondary shoe component is connected to the second primary shoe component based on the second shoe model being different from the first shoe model; and providing the plurality of shoes, wherein at least one of the plurality of shoes comprises a first shoe corresponding to the first shoe model and formed at least in part from the first primary shoe component automatically welded together with the first secondary shoe component, and wherein at least another of the plurality of shoes comprises a second shoe corresponding to the second shoe model and formed at least in part from the second primary shoe component automatically welded together with the second secondary shoe component.

2. The method according to claim 1, wherein the secondary shoe components comprise at least one of an eyelet, heel cap, toe cap, decoration element, decoration stripe, friction element, abrasion protection element, rib element, reinforcement element, stiffening element, supporting element, cushioning element, or fiber element.

3. The method according to claim 1, further comprising separating at least the subset of the plurality of primary shoe components from the transport belt by performing at least one of the following processing steps: die cutting, CNC cutting, laser cutting, water jet cutting, melting out of a connecting element, or dissolving a connecting element.

4. The method according to claim 1, further comprising forming the plurality of primary shoe components into three-dimensional shapes, wherein the plurality of primary shoe components each comprise a shaping element configured to facilitate forming each of the plurality of primary shoe components into the three-dimensional shape, wherein forming each of the plurality of primary shoe components into the three-dimensional shape comprises arranging each of the plurality of primary shoe components on a respective last.

5. A method for the manufacture of a plurality of shoes, the method comprising:
  providing an automatically-driven transport belt comprising a knit material defining a plurality of flat regions that include at least a first flat region and a second flat region, the knit material further at least partially defining a plurality of primary shoe components for the manufacture of the plurality of shoes, wherein each of the plurality of primary shoe components comprise at least a part of a shoe sole, wherein the plurality of primary shoe components includes at least a first primary shoe component that is configured for a first shoe model and that is incorporated into the first flat region, wherein the plurality of primary shoe components further includes at least a second primary shoe component that is configured for a second shoe model and that is incorporated into the second flat region, the second shoe model being different from the first shoe model;

passing the automatically-driven transport belt through at least one first processing station comprising at least one first automated robotic system for adding secondary shoe components to the primary shoe components;

processing at least a subset of the plurality of primary shoe components in the at least one first processing station by at least:
  adding a first secondary shoe component to the first primary shoe component of the first flat region of the knit material of the transport belt through automated operation of the at least one first automated robotic system; and
  adding a second secondary shoe component to the second primary shoe component of the second flat region of the knit material of the transport belt through automated operation of the at least one first automated robotic system, wherein the second secondary shoe component is different than the first secondary shoe component based on the second shoe model being different from the first shoe model;

passing the automatically-driven transport belt through at least one second processing station comprising at least one second automated robotic system for connecting the secondary shoe components to the primary shoe components by welding;

processing at least a subset of the plurality of primary shoe components in the at least one second processing station by at least:
  connecting the first secondary shoe component to the first primary shoe component of the first flat region of the knit material of the transport belt by welding through automated operation of the at least one second automated robotic system; and connecting the second secondary shoe component to the second primary shoe component of the second flat region of the knit material of the transport belt by welding through automated operation of the at least one second automated robotic system wherein the first secondary shoe component is connected to the first primary shoe component by first welding that is different than second welding by which the second secondary shoe component is connected to the second primary shoe component based on the second shoe model being different from the first shoe model; and providing the plurality of shoes, wherein at least one of the plurality of shoes comprises a first shoe corresponding to the first shoe model and formed at least in part from the first primary shoe component automatically welded together with the first secondary shoe component, and wherein at least another of the plurality of shoes comprises a second shoe corresponding to the second shoe model and formed at least in part from the second primary shoe component automatically welded together with the second secondary shoe component.

6. The method according to claim 5, wherein the secondary shoe components comprise at least one of an eyelet, heel cap, toe cap, decoration element, decoration stripe, friction element, abrasion protection element, rib element, reinforcement element, stiffening element, supporting element, cushioning element, or fiber element.

7. The method according to claim 5, further comprising separating at least the subset of the plurality of primary shoe components from the transport belt by performing at least one of the following processing steps: die cutting, CNC cutting, laser cutting, water jet cutting, melting out of a connecting element, or dissolving a connecting element.

8. The method according to claim 5, further comprising forming the plurality of primary shoe components into three-dimensional shapes, wherein the plurality of primary shoe components each comprise a shaping element configured to facilitate forming each of the plurality of primary shoe components into the three-dimensional shape, wherein forming each of the plurality of primary shoe components into the three-dimensional shape comprises arranging each of the plurality of primary shoe components on a respective last.

9. A method for the manufacture of a plurality of shoes, the method comprising:
providing an automatically-driven transport belt comprising a knit material defining a plurality of regions that include at least a first region and a second region, the knit material further at least partially defining a plurality of primary shoe components for the manufacture of the plurality of shoes, wherein the plurality of primary shoe components includes at least a first primary shoe component that is configured for a first shoe model and that is incorporated into the first region, wherein the plurality of primary shoe components further includes at least a second primary shoe component that is configured for a second shoe model and that is incorporated into the second region, the second shoe model being different from the first shoe model;
passing the automatically-driven transport belt through at least one first processing station comprising at least one first automated robotic system for adding secondary shoe components to the primary shoe components;
processing at least a subset of the plurality of primary shoe components in the at least one first processing station by at least:
adding a first secondary shoe component to the first primary shoe component of the first region of the knit material of the transport belt through automated operation of the at least one first automated robotic system; and
adding a second secondary shoe component to the second primary shoe component of the second region of the knit material of the transport belt through automated operation of the at least one first automated robotic system;
passing the automatically-driven transport belt through at least one second processing station comprising at least one second automated robotic system for connecting the secondary shoe components to the primary shoe components by welding;
processing at least a subset of the plurality of primary shoe components in the at least one second processing station by at least:
connecting the first secondary shoe component to the first primary shoe component of the first region of the knit material of the transport belt by welding through automated operation of the at least one second automated robotic system; and
connecting the second secondary shoe component to the second primary shoe component of the second region of the knit material of the transport belt by welding through automated operation of the at least one second automated robotic system; and
providing the plurality of shoes, wherein at least one of the plurality of shoes comprises a first shoe corresponding to the first shoe model and formed at least in part from the first primary shoe component automatically welded together with the first secondary shoe component, and wherein at least another of the plurality of shoes comprises a second shoe corresponding to the second shoe model and formed at least in part from the second primary shoe component automatically welded together with the second secondary shoe component.

10. The method according to claim 9, wherein each of the plurality of primary shoe components comprise at least a part of a shoe upper.

11. The method according to claim 9, wherein each of the plurality of primary shoe components comprise at least a part of a shoe sole.

12. The method according to claim 9, further comprising processing at least some of the subset of the plurality of first shoe components in at least one processing station by at least one automated robotic system performing at least one of the following processing steps: screen printing, digital printing, dye sublimation, sublimation printing, pad printing, spraying on color, applying at least one color-changing material, applying at least one foil element, impregnating with a material, coating with a material, applying at least one glue, flocking, laser cutting, laser engraving, embroidering, thermoforming, locally melting, locally fusing, embossing, laser etching, or perfing.

13. The method according to claim 9, wherein the secondary shoe components comprise at least one of an eyelet, heel cap, toe cap, decoration element, decoration stripe, friction element, abrasion protection element, rib element, reinforcement element, stiffening element, supporting element, cushioning element, or fiber element.

14. The method according to claim 9, further comprising separating at least the subset of the plurality of primary shoe components from the transport belt.

15. The method according to claim 14, wherein separating at least the subset of the plurality of first shoe components from the transport belt comprises performing at least one of the following processing steps: die cutting, CNC cutting, laser cutting, water jet cutting, melting out of a connecting element, or dissolving a connecting element.

16. The method according to claim 9, further comprising forming the plurality of primary shoe components into three-dimensional shapes.

17. The method according to claim 16, wherein the plurality of primary shoe components each comprise a shaping element configured to facilitate forming each of the plurality of primary shoe components into the three-dimensional shape.

18. The method according to claim 17, wherein forming each of the plurality of primary shoe components into the three-dimensional shape comprises arranging each of the plurality of primary shoe components on a respective last.

19. The method according to claim 9, wherein the first primary shoe component has a first shape, wherein the second primary shoe component has a second shape, and wherein the first shape and the second shape are different from one another based on the second shoe model being different from the first shoe model.

20. The method according to claim 9, wherein the welding comprises high frequency welding, ultrasonic welding, or laser welding; or
wherein the second secondary shoe component is different than the first secondary shoe component based on the second shoe model being different from the first shoe model, wherein the first secondary shoe component is connected to the first primary shoe component by first welding that is different than second welding by which the second secondary shoe component is connected to the second primary shoe component based on the second shoe model being different from the first shoe model.

* * * * *